US009256225B2

(12) United States Patent
Downey et al.

(10) Patent No.: US 9,256,225 B2
(45) Date of Patent: Feb. 9, 2016

(54) UNMANNED AERIAL VEHICLE AUTHORIZATION AND GEOFENCE ENVELOPE DETERMINATION

(71) Applicant: Unmanned Innovation, Inc., San Francisco, CA (US)

(72) Inventors: Jonathan Downey, San Francisco, CA (US); Bernard J. Michini, San Francisco, CA (US); Joseph Moster, San Francisco, CA (US); Donald Curry Weigel, Los Altos, CA (US); James Ogden, Tracy, CA (US)

(73) Assignee: UNMANNED INNOVATION, INC., San Francisco, CA (US)

( * ) Notice: Subject to any disclaimer, the term of this patent is extended or adjusted under 35 U.S.C. 154(b) by 0 days.

(21) Appl. No.: 14/709,324

(22) Filed: May 11, 2015

(65) Prior Publication Data

US 2015/0323930 A1    Nov. 12, 2015

Related U.S. Application Data

(62) Division of application No. 61/991,826, filed on May 12, 2014.

(51) Int. Cl.
*G05D 1/00* (2006.01)
*G07C 5/02* (2006.01)
(Continued)

(52) U.S. Cl.
CPC ............ *G05D 1/0022* (2013.01); *G05D 1/0202* (2013.01); *G07C 5/008* (2013.01);
(Continued)

(58) Field of Classification Search
CPC .. B64C 39/024; G08G 5/0091; G08G 5/0039; G08G 5/0034; G01C 23/00; G05D 1/105; B64D 17/00; G07C 5/008
USPC .................... 701/2, 3, 14, 436, 467; 244/186; 348/144
See application file for complete search history.

(56) References Cited

U.S. PATENT DOCUMENTS

| 5,550,736 A | 8/1996 | Hay |
| 6,122,572 A | 9/2000 | Yavnai |

(Continued)

FOREIGN PATENT DOCUMENTS

| EP | 0758972 A1 | 12/1997 |
| EP | 1677172 A2 | 7/2006 |

(Continued)

OTHER PUBLICATIONS

International Search Report and Written Opinion mailed May 30, 2013 for International Application No. PCT/US2013/051227.
(Continued)

*Primary Examiner* — Tuan C. To
*Assistant Examiner* — Yuri Kan
(74) *Attorney, Agent, or Firm* — Knobbe Martens Olson & Bear LLP

(57) ABSTRACT

Methods, systems, and apparatus, including computer programs encoded on computer storage media, for unmanned aerial vehicle authorization and geofence envelope determination. One of the methods includes determining, by an electronic system in an Unmanned Aerial Vehicle (UAV), an estimated fuel remaining in the UAV. An estimated fuel consumption of the UAV is determined. Estimated information associated with wind affecting the UAV is determined using information obtained from sensors included in the UAV. Estimated flights times remaining for a current path, and one or more alternative flight paths, are determined using the determined estimated fuel remaining, determined estimated fuel consumption, determined estimated information associated wind, and information describing each flight path. In response to the electronic system determining that the estimated fuel remaining, after completion of the current flight path, would be below a first threshold, an alternative flight path is selected.

24 Claims, 8 Drawing Sheets

(51) Int. Cl.
- *H04W 4/02* (2009.01)
- *H04W 48/02* (2009.01)
- *G05D 1/02* (2006.01)
- *G08G 5/00* (2006.01)
- *G07C 5/00* (2006.01)

(52) U.S. Cl.
CPC .............. *G07C 5/02* (2013.01); *G08G 5/0039* (2013.01); *G08G 5/0069* (2013.01); *H04W 4/021* (2013.01); *H04W 48/02* (2013.01)

(56) References Cited

U.S. PATENT DOCUMENTS

| | | |
|---|---|---|
| 6,289,467 B1 | 9/2001 | Lewis |
| 6,497,388 B1 | 12/2002 | Friend |
| 6,522,867 B1 | 2/2003 | Wright |
| 6,665,594 B1 | 12/2003 | Armstrong |
| 6,665,613 B2 | 12/2003 | Duvall |
| 7,093,798 B2 | 8/2006 | Whelan |
| 7,127,334 B2 | 10/2006 | Frink |
| 7,762,496 B2 | 7/2010 | Seiersen |
| 7,912,630 B2 | 3/2011 | Alewine et al. |
| 7,938,362 B2 | 5/2011 | Kismarton |
| 8,000,689 B2 | 8/2011 | Featherstone et al. |
| 8,073,578 B1 * | 12/2011 | McCusker ............ G08G 5/0034 701/10 |
| 8,100,362 B2 | 1/2012 | Guering |
| 8,111,154 B1 | 2/2012 | Puri et al. |
| 8,213,957 B2 | 7/2012 | Bull et al. |
| 8,223,012 B1 | 7/2012 | Diem |
| 8,256,715 B2 | 9/2012 | Ballard et al. |
| 8,260,479 B2 | 9/2012 | Christenson |
| 8,284,748 B2 | 10/2012 | Borghei |
| 8,306,737 B2 | 11/2012 | Nguyen |
| 8,308,108 B2 | 11/2012 | Cazals |
| 8,360,362 B2 | 1/2013 | Kismarton |
| 8,412,166 B2 | 4/2013 | Ellanti et al. |
| 8,515,609 B2 | 8/2013 | McAndrew et al. |
| 8,531,293 B2 | 9/2013 | Putz |
| 8,655,593 B1 | 2/2014 | Davidson |
| 8,751,144 B2 | 6/2014 | Tzao |
| 8,825,225 B1 | 9/2014 | Stark et al. |
| 8,862,285 B2 | 10/2014 | Wong et al. |
| 8,874,283 B1 | 10/2014 | Cavote |
| 8,876,571 B2 | 11/2014 | Trowbridge et al. |
| 8,880,241 B2 | 11/2014 | Mohamadi |
| 8,903,568 B1 | 12/2014 | Wang |
| 8,938,160 B2 | 1/2015 | Wang |
| 8,941,489 B2 | 1/2015 | Sheshadri et al. |
| 9,066,464 B2 | 6/2015 | Schmidt et al. |
| 2003/0060938 A1 | 3/2003 | Duvall |
| 2003/0065428 A1 | 4/2003 | Mendelson |
| 2003/0093187 A1 | 5/2003 | Walker |
| 2004/0036630 A1 | 2/2004 | Jamieson et al. |
| 2004/0068351 A1 | 4/2004 | Solomon |
| 2004/0162638 A1 | 8/2004 | Solomon |
| 2005/0060213 A1 | 3/2005 | Lavu et al. |
| 2005/0156715 A1 | 7/2005 | Zou et al. |
| 2005/0159883 A1 | 7/2005 | Humphries et al. |
| 2006/0155425 A1 | 7/2006 | Howlett |
| 2006/0262781 A1 | 11/2006 | Campini |
| 2006/0270421 A1 | 11/2006 | Phillips et al. |
| 2007/0069083 A1 | 3/2007 | Shams et al. |
| 2007/0100538 A1 * | 5/2007 | Wise ............ G01C 23/00 701/436 |
| 2007/0138345 A1 * | 6/2007 | Shuster ............ G05D 1/105 244/186 |
| 2007/0266192 A1 | 11/2007 | Campini |
| 2008/0007928 A1 | 1/2008 | Salama et al. |
| 2008/0077299 A1 | 3/2008 | Arshad et al. |
| 2008/0094256 A1 | 4/2008 | Koen |
| 2008/0174448 A1 | 7/2008 | Hudson |
| 2008/0178463 A1 | 7/2008 | Okubora |
| 2008/0186165 A1 | 8/2008 | Bertagna et al. |
| 2008/0210809 A1 | 9/2008 | Arlton et al. |
| 2008/0255711 A1 | 10/2008 | Matos |
| 2009/0087029 A1 | 4/2009 | Coleman |
| 2009/0088972 A1 | 4/2009 | Bushnell |
| 2009/0114764 A1 | 5/2009 | Builta et al. |
| 2009/0150070 A1 | 6/2009 | Alewine et al. |
| 2009/0219393 A1 * | 9/2009 | Vian ............ G07C 5/008 348/144 |
| 2009/0312032 A1 | 12/2009 | Bornstein et al. |
| 2010/0042940 A1 | 2/2010 | Monday et al. |
| 2010/0049987 A1 | 2/2010 | Ettorre |
| 2010/0145556 A1 | 6/2010 | Christenson |
| 2010/0155611 A1 | 6/2010 | Fullwood |
| 2010/0168937 A1 | 7/2010 | Soijer et al. |
| 2010/0201806 A1 | 8/2010 | Nygaard |
| 2010/0235032 A1 | 9/2010 | Sung et al. |
| 2011/0022770 A1 | 1/2011 | Sullivan |
| 2011/0130636 A1 | 6/2011 | Daniel et al. |
| 2011/0133888 A1 | 6/2011 | Stevens et al. |
| 2011/0178811 A1 | 7/2011 | Sheridan |
| 2011/0196564 A1 | 8/2011 | Coulmeau |
| 2011/0258021 A1 | 10/2011 | Mumaw et al. |
| 2011/0301784 A1 | 12/2011 | Oakley |
| 2011/0320068 A1 | 12/2011 | Lee et al. |
| 2012/0022719 A1 | 1/2012 | Matos |
| 2012/0044710 A1 | 2/2012 | Jones |
| 2012/0104517 A1 | 5/2012 | Huang |
| 2012/0209457 A1 | 8/2012 | Bushnell |
| 2012/0232722 A1 | 9/2012 | Fisher et al. |
| 2012/0233447 A1 | 9/2012 | Fitzgerald |
| 2012/0253555 A1 | 10/2012 | Stange |
| 2012/0296499 A1 * | 11/2012 | Kirchhofer ............ G01C 23/00 701/3 |
| 2012/0299751 A1 | 11/2012 | Verna et al. |
| 2012/0319815 A1 | 12/2012 | Feldman |
| 2013/0009013 A1 * | 1/2013 | Bourakov ............ B64D 17/00 244/186 |
| 2013/0085669 A1 * | 4/2013 | Bailey .................. G08G 5/0039 701/467 |
| 2013/0345920 A1 | 12/2013 | Duggan et al. |
| 2014/0018979 A1 | 1/2014 | Goossen et al. |
| 2014/0032034 A1 | 1/2014 | Raptopoulos et al. |
| 2014/0163852 A1 | 6/2014 | Borri et al. |
| 2014/0172194 A1 * | 6/2014 | Levien ................ G08G 5/0091 701/2 |
| 2014/0212986 A1 | 7/2014 | Angelescu et al. |
| 2014/0222248 A1 | 8/2014 | Levien et al. |
| 2014/0244078 A1 | 8/2014 | Downey et al. |
| 2014/0249693 A1 * | 9/2014 | Stark .................... B64C 39/024 701/2 |
| 2014/0277834 A1 * | 9/2014 | Levien ................ B64C 39/024 701/2 |
| 2014/0325644 A1 | 10/2014 | Oberg |

FOREIGN PATENT DOCUMENTS

| | | |
|---|---|---|
| EP | 2156216 A1 | 2/2010 |
| EP | 2212199 A1 | 8/2010 |
| JP | 06-195125 | 7/1994 |
| JP | 08-048297 | 2/1996 |

OTHER PUBLICATIONS

International Search Report and Written Opinion of the International Searching Authority for International Application No. PCT/US2015/030229, mailed Aug. 24, 2015, in 11 pages.

Extended European Search Report dated Jul. 30, 2015, regarding Application No. EP 12 83 9320, 5 pages.

* cited by examiner

| UAV Systems Database | | | |
|---|---|---|---|
| Summary | Flight Tests | Systems | Inventory |
| Flights | 202 Vehicles | Software | |

200

Vehicle Flight Totals 204

| System_Name 206 | 208 Total Flights | 210 Flight Time |
|---|---|---|
| F-450 [3] | 13 | 79 |
| MK-Okto | 7 | 127 |
| SkyWalker X-8 [1] | 4 | 42 |
| Toledo [1] | 22 | 243 |
| Toledo [2] | 10 | 80 |

Thursday, May 08, 2014

Page 1 of 1

FIG. 2

UNMANNED AERIAL VEHICLE AUTHORIZATION AND GEOFENCE ENVELOPE DETERMINATION

BACKGROUND

The regulatory hurdles that an organization (e.g., governmental organization, or company) need to overcome to obtain authorization to fly unmanned aerial vehicles (UAV) can be great. An organization intending to fly a UAV over populated regions typically has to show that their UAV and flight operation are airworthy and safe.

SUMMARY

In general, one innovative aspect of the subject matter described in this specification can be embodied in methods that include the actions of a method implemented by an Unmanned Aerial Vehicle (UAV) in flight, the UAV comprising an electronic system comprising hardware, the method comprising: determining, by the UAV electronic system, an estimated fuel remaining in the UAV; determining, by the UAV electronic system, an estimated fuel consumption of the UAV; determining by the UAV electronic system, using information obtained from sensors included in the UAV, estimated information associated with wind affecting the UAV; determining estimated flight times remaining for a current flight path, and one or more alternative flight paths, wherein determining an estimated flight time, for each of the current and alternative flight paths, uses: the determined estimated fuel remaining, the determined estimated fuel consumption, the information associated with wind, and information describing the current and alternative flight paths; and in response to determining that the estimated fuel remaining, after completion of the current flight path, would be below a first threshold, selecting an alternative flight path based at least in part on the determined estimated fuel remaining, the determined estimated fuel consumption, and the information associated with wind.

Particular embodiments of the subject matter described can be implemented so as to realize one or more of the following advantages. A system can automatically gather information associated with one or more unmanned air vehicles (UAVs), and generate, optionally without user interaction, a flight authorization request to provide to a regulatory agency, e.g., the Federal Aviation Administration (FAA). The system can store information describing UAVs, particular components included in each UAV (e.g., electrical components, static mechanical components, actuators, engines, props, sensors, batteries, parachutes, landing gear, antennas, etc.), and/or UAV operators, and determine risk information. For instance, the system can rapidly determine that a particular component has experienced errors in the past (e.g., where the number and/or type of errors exceed a threshold), and based at least in part on such determination, should not be included in a flight operation due to the increased possibility of a potential failure. Additionally, a cloud system can store locations of flying UAVs and determine geofence envelopes, and flight paths, to allocate to flying UAVs in a quick, accurate, and efficient manner. Therefore, if a UAV experiences a flight critical error (e.g., a one that may impact safety issues), the cloud system can determine an updated geofence envelope, or flight path, to provide to the UAV.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 illustrates a user interface that includes an example report identifying flight information.

Like reference numbers and designations in the various drawings indicate like elements.

DETAILED DESCRIPTION

Figure 1:
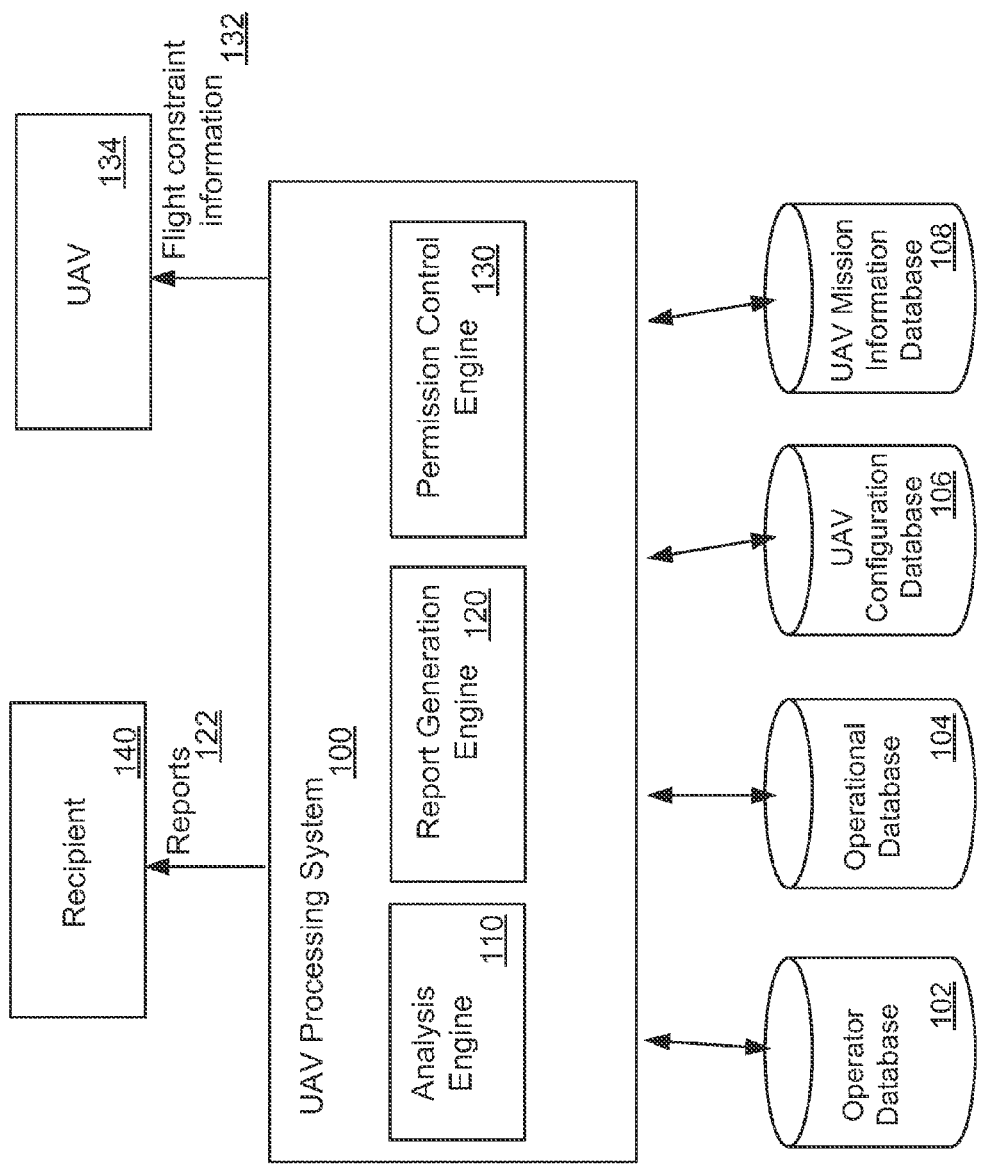
FIG. 1 illustrates a block diagram of an example Unmanned Aerial Vehicle (UAV) processing system.

Among other features, this specification describes a system to automatically determine risks associated with an unmanned vehicle's flight operation (e.g., pilot information, flight pattern, contingency plans, flight worthiness of the vehicle), and generate an authorization request to provide to an organization, e.g., a regulatory agency such as the Federal Aviation Administration, for approval of the flight operation. Contingency plans can be pre-programmed flight plans or behaviors that the UAV can execute autonomously in the event of an off-nominal detected contingency condition, e.g., flight error or failure. The unmanned vehicles may include unmanned aerial vehicles (UAVs), such as drones, unpiloted aerial vehicles, remotely piloted aircraft, unmanned aircraft systems, any aircraft covered under Circular 328 AN/190 classified by the International Civil Aviation Organization, and so on. UAV will be used throughout this specification, however it should be understood that UAV means any unmanned vehicle as defined above and elsewhere in this specification, unless the context indicates otherwise.

Specifically, the system can obtain, and store, operator data (e.g., pilot information such as hours flown, trainings completed and licenses obtained), UAV configuration information for particular UAVs (e.g., information identifying components of each UAV, such as specific components, associated software versions, and/or weights of the components, optionally along with flight information, such as contingency plans), operational information (e.g., information gleaned or collected after respective flights or maintenances of particular UAVs), and/or mission information (e.g., information generated by flight critical systems or payload systems included in the UAV, such as video, images, signals intelligence, and so on).

The system can determine performance characteristics of the above information, which can include any information that can inform, or affect, a safe, or functional, UAV flight operation. Using some or all of the determined performance characteristics, the system can determine degradation or potential degradation of components in a UAV (e.g., since a last maintenance), flight totals and mean (or other central tendency) flight time of pilots, and so on. The system utilizes these performance characteristics to determine risk assessments of particular UAVs, components included in UAVs (e.g., to identify a faulty type of component before flight failure can occur), and/or particular operators (e.g., pilots).

The system can receive, or generate, flight operation information identifying a requested UAV operation (e.g., flight path, type of UAV, components included in the UAV, and/or operators piloting the UAV), and generate an authorization request to provide to an organization, e.g., a regulatory agency, such as the FAA. The above can be accomplished quickly and accurately, increasing the ability of an organization to quickly plan and submit planned flight operations for authorization. Additionally, the approving agency can have greater faith that the submitted information is accurate and includes no errors, since it is based on empirical historical information.

FIG. 1 illustrates a block diagram of an example Unmanned Aerial Vehicle (UAV) processing system 100. The UAV processing system 100 can be a system of one or more computers, or software executing on a system of one or more computers, which is in communication with, or maintains, one or more databases, e.g., databases 102-108, storing information describing UAV flight operations and components. The UAV processing system 100 can analyze performance characteristics of information stored in the databases, and determine risk assessment information for use in generating authorization requests for desired flight operations.

The example UAV processing system 100 includes an analysis engine 110 that determines performance characteristics of information included in one or more databases, e.g., databases 102-108. As described above, performance characters can include any information that can inform, or affect, a safe, or functional, UAV flight operation. Optionally, the information stored in the databases 102-108 can be associated with metadata describing a context of the stored information, e.g., a database storing information identifying a particular component (e.g., a unique serial number) can be associated with metadata describing UAVs it was included in (e.g., unique UAV serial numbers), and so on.

The analysis engine 110 is in communication with an operator database 102. The operator database 102 can store pilot information describing one or more UAV pilots. The pilot information can include a name and/or other identifier of each pilot, along with associated companies (e.g., a company that hired the pilot for a flight operation). Additionally, the operator database 102 can store a number of hours flown by each pilot (e.g., in a selectable period of time, or across his/her entire career), trainings completed and credentials or licenses obtained (e.g., an instrument rating under the Instrument Flight Rules, particular class of airman medical certificate, pilot proficiency events, an FAA UAV operator certificate, and so on), simulation flight time of the pilot, and etc.

Along with information identifying pilots, the operator database 102 can map each pilot to specific UAVs, models of UAVs, or types of UAVs (e.g., propeller, rotor, jet, small, medium, large, military, civilian, reconnaissance, delivery, etc.) they have flown, or participated in a flight operation in a different capacity, e.g., as an observer.

The analysis engine 110 is in communication with an operational database 104. The operational database 104 can store flight information, and maintenance information, generated by particular UAVs during use, or manually described/entered by maintenance personnel. Flight and maintenance information can be obtained from one or more flight logs generated by UAVs (e.g., logs that identify continuously updating information including UAV location, and particular events including errors generated during flight). Flight logs can include error logs, logs describing flight actions, sensor reading logs, autopilot logs, and so on.

For instance, operational information can include information associated with an inertial measurement unit (e.g., acceleration, gyration, magnetic readings, and vibration analysis). Operational information can include attitude and/or altitude (e.g., determined from barometric readings, ground distance sensors, global positioning systems, etc.). Operational information can include velocity of the UAV, battery health tracking (e.g., voltage, current, temperature), and/or flight path (e.g., position, altitude, airspeed velocity, ground velocity, orientation). Operational information can include identifications of warnings and errors, configuration changes made in-flight to UAV components, execution of particular contingency plans, UAV state changes (e.g., on-ground, in-flight, landing), controller modes, and/or flight time. The operational information can include communication information (e.g., strength of signals received from outside communication systems including ground datalinks, data packet loss, transmission rates), thermal measurements (e.g., history of thermal cycles encountered, exceedance of thermal limits), and so on.

Optionally, the UAV processing system 100 can connect to a UAV, obtain operational information from the UAV, and store the information in the operational database 104, e.g., with associated metadata identifying the UAV. Optionally, the analysis engine 110 can obtain operational information inputted, e.g., into a system in communication with the UAV processing system 100, by maintenance personnel. The operational information can include written information describing the UAV, which the analysis engine 110 can obtain and parse to identify UAV operational information.

The analysis engine 110 is in communication with a UAV configuration database 106. The UAV configuration database 106 stores information describing components (e.g., hardware and software) included in particular UAVs, and actions that users (e.g., pilots) took while operating the particular UAVs.

For instance, the UAV configuration database 106 can store information identifying specific hardware in use (e.g., serial numbers, types of hardware, physical configuration of the hardware, flight hours which can be similar to a HOBBS meter, and batteries used including the number of charge/discharge cycles undergone). The UAV configuration database 106 can store one or more versions of software included in the UAV, including any issuer-recoverable methods to sign safety-critical hardware and software (e.g., identifying the hardware or software as Certified, Trusted, or neither). The UAV configuration database 106 can store standard operation procedures of the UAV, total system weight or weight of particular hardware, and/or software configuration information (e.g., calibration data, configuration settings such as modes of operation).

The analysis engine 110 is in communication with a UAV mission information database 108. The UAV mission information database 108 stores information generated during missions of particular UAVs, including data generated by flight critical modules (e.g., datalink information, global positioning system information), payload modules included in the UAVs (e.g., cameras, sensors), and/or modules included outside of the UAV (e.g., ground sensors).

The UAV mission information database 108 can store video, still images, signals intelligence, range measurements, electromagnetic measurements, determined atmospheric pressure, gravitational measurements, radar measurements, data transmitted to or from the UAV, radio frequency identification (RFID) readings, atmospheric composition, gas type readings, meteorological measurements, sunlight radiance, data on physical substances (e.g., transported, received, captured, dropped), data on physical packages (e.g., transported, received, captured, dropped), and so on. The UAV mission information database 108 can associate the stored information with metadata, including tags, notes, geotags, aircraft state information, and/or sensor states.

The analysis engine 110 can obtain information from the databases 102-108, and generate performance characteristics related to operation of the UAV. The databases 102-108 can optionally be associated with each other, to link information from one database to a different database. In this way, the analysis engine 110 can obtain, for example, each component that was ever included in a particular UAV, or each component that experienced an error that was ever included in a particular UAV. Optionally, the databases 102-108 may be combined into fewer databases or configured as a larger number of databases.

By way of illustrative example, the analysis engine 110 can determine the battery health of batteries included in a particular UAV. The analysis engine 110 can obtain voltage, current draw, and temperature information, of batteries included in the particular UAV over a period of time (e.g., a most recent flight operation, or flight operations of a selectable period of time). The analysis engine 110 can then determine an estimate of the health of the batteries, which the analysis engine 110 can utilize to inform a determination regarding maximum UAV flight power (e.g., maximum power that can be extracted from the batteries), endurance (e.g., longevity of the batteries), and probability of failure (e.g., likelihood that the batteries will fail). The analysis engine 110 can effect these determinations with information identifying average estimated charge/recycle cycles available to the battery, and so on.

The analysis engine 110 can perform a vehicle vibration analysis, to determine whether issues with the UAV airframe exist. The non-exhaustive example list of issues includes, unbalanced propellers or rotors spinning, structural modes of the UAV aircraft, loose structural elements, controller induced modes (e.g., control surfaces moving in such a way as to cause vibrations in the UAV aircraft as a result of following instructors from the controller), issues with the inertial measurement sensors, and so on. The analysis engine 110 may identify additional, fewer, or different UAV airframe issues.

The analysis engine 110 can then generate a vibration profile of specific UAVs (e.g., the analysis engine 110 can run simulations using the UAV aircraft or airframe type or the specific UAV model, and sensor information including acceleration, gyration, magnetometer, and other sensor data). The analysis engine 110 can track particular UAVs over a period of time, to identify any changes in vibration profiles. The analysis engine 110 can utilize the changes to determine possible causal factors. For example, if the vibration profiles shows an increase in vibrations above a certain airspeed, the analysis engine 110 can determine that there is a probability that the aircraft is exciting a structural mode. Optionally, the analysis engine 110 can associate a particular UAV with UAVs that include similar components and/or are of a similar UAV airframe or model type. In this way, the analysis engine 110 can determine that a particular UAV might exhibit vibration characteristics similar to other UAVs.

The analysis engine 110 can determine whether breach of flight authorizations occurred. A flight authorization can identify specific flight paths, airspaces, speed, weight, maneuvers, and/or flight duration at a given location, of a UAV. Thus, the analysis engine 110 can determine violations of constraints and restrictions identified in a flight authorization for a particular UAV, e.g., from locations of the UAV, operator actions, airspeeds of the UAV, weights of components included in the UAV, and so on. Additionally, the analysis engine 110 can determine whether operator actions caused a breach of a flight authorization, and use this determination to inform a risk assessment of the operator, e.g., described below.

Furthermore, the analysis engine 110 can aggregate performance characteristics, to identify performance characteristics associated with specific components, or types of components, included in multiple UAVs, performance characteristics of specific operators, classes of UAVs, models of UAVs, types of UAV airframes, and operating environments (e.g., temperature, humidity, wind velocity, or other weather related parameters) experienced by UAVs. As an example of operating environments, the analysis engine 110 can determine that particular components are degraded (e.g., corroded) after being in heavy rain or operating above a certain air temperature for more than a certain threshold of time. To effect this determination, the analysis engine 110 can obtain maintenance information after UAV flights, and determine that the weather is associated with the damage.

In addition to the above, the analysis engine 110 can determine summarizing performance characteristics, including flight totals and flight times of specific UAVs, specific components, and/or operators. The analysis engine 110 can determine a measure of central tendency (e.g., mean, median, mode, geometric mean, harmonic mean, weighted mean, truncated mean, midrange mean, trimean, winsorized mean, etc.) between failures of UAVs, specific components, and operators. As described above, the analysis engine 110 can determine performance degradation of specific components, e.g., batteries, and of a UAV (e.g., from performance degradation of components included in the UAV, and performance degradation of the UAV airframe).

The UAV processing system 100 includes a report generation engine 120 that can generate reports 122 using information determined by the analysis engine 110. A user can provide a request to the UAV processing system 100, or to a system in communication with the UAV processing system 100, specifying information he/she is interested in. For instance, the user can specify that he/she is interested in performance degradation information of a particular UAV. Additionally, the user can specify that he/she is interested in a number of flights that one or more UAVs have taken. The request for information can be limited to a specific time period (e.g., obtained for flights that have occurred in the last 12 months or between 1-3 years ago). The UAV processing system 100 can then obtain and process the information, and generate a report 122, e.g., a user interface, identifying the information. Optionally, the report generation engine 120 can apply privacy restrictions to information determined by the analysis engine 120 (e.g., only users associated with a company that performed a specific flight, or that uses a specific UAV, can obtain information related to the specific flight or specific UAV). Access to the report generation engine 120 can be provided through one or more application programming interface (API) functional calls, optionally with each functional call incurring a particular cost to be paid by a user.

For instance, FIG. 2 illustrates a user interface 200 that includes an example report identifying example flight information. In the user interface 200, a user has selected an option to display information associated with "Vehicles" 202. The user interface 202 therefore includes information related to UAV flights, e.g., "Vehicle Flight Totals" 204. The information includes names associated with various UAVs 206, e.g., "F-450", "MK-Okto", and so on. Optionally, unique serial numbers or other identifier types may be provided for each of the listed UAVs. The information further includes associated flight totals and flight times 210 of the UAVs, e.g., "F-450" had "13" flights with a total flight time of "79" hours.

The report generation engine 120 can generate risk assessments reports 122 regarding particular aspects of a flight operation, e.g., in response to receiving a request identifying the particular aspects. A risk assessment report 122 can include determinations of values of risk, e.g., qualitative or quantitative values (e.g., a risk rating on a numerical scale (e.g., 1-10), a risk grade (e.g., on a scale of A-F, where A is the safest and F is the riskiest), a probability of a safety related error occurring, a probability of a non-safety, mission related error occurring, a textual description of the cause of the risk and the possible outcomes, etc.). For instance, a risk assessment report 122 can include an assessment of the risk of flying a particular UAV, using a particular component, using a particular operator, using a particular operator to fly a particular UAV, and so on. Additionally, a risk assessment report 122 can identify an overall risk assessment of an entire flight operation, e.g., a particular UAV, particular components or class of components to include in the particular UAV, particular operators to implement the flight operation, and so on.

To generate a risk assessment report 122 regarding one or more aspects of a flight operation, the report generation engine 120 can obtain information, e.g., from the databases 102-108, and determined performance characteristics, related to the aspects. For example, if a user identifies that he/she wants a risk assessment report 122 regarding a particular component, the report generation engine 120 can identify performance characteristics of the particular component across different flight operations that have used the particular component.

The report generation engine 120 can determine an overall risk assessment indicator of the requested aspects. The indicator can include a value, e.g., within a particular value range, a letter, e.g., within a particular range of letters, and/or a percentage, e.g., a percentage within a particular percentage range. To determine the overall risk assessment indicator, the report generation engine 120 can determine performance characteristics of the aspects identified in a request, and determine a risk assessment score of the performance characteristics. The report generation engine 120 can then combine/aggregate the risk assessment scores according to one or more methods. For instance, the report generation engine 120 can obtain information identifying weights to apply to each risk assessment score, and compute a sum of the weighted risk assessment scores. The weights can be based on, for instance, an importance of the aspect to a safe flight operation. Additionally, the report generation engine 120 can combine the risk assessment scores utilizing a machine-learning model, which can be trained on information describing UAV flight operations with associated flight errors, and failures, of flight operations.

The overall risk assessment indicator can indicate the likelihood of risk to a flight operation, e.g., likelihood of success of the operation, or the likelihood of risk of utilizing particular components, or operators, identified in the request. For instance, in a risk assessment report 122 regarding an entire flight operation, the report generation engine 120 can determine a likelihood of the flight operation being successfully completed without error or incident. For example, to determine a likelihood of success, the report generation engine 120 can obtain a vibration analysis of a UAV to be used in the flight operation, and determine whether the vibration analysis indicates a high likelihood of UAV failure. In another example, the report generation engine 120 can obtain information identifying contingency plans of the UAV, and determine whether the UAV has contingency plans appropriate for the particular flight path identified in the flight operation. For instance, if the UAV will be traveling over water, the report generation engine 120 can determine whether the UAV stores a contingency plan associated with failure over water.

The report generation engine 120 can generate authorization request reports 122 to be provided to a recipient 140, such as an authorizing agency, e.g., a governmental agency, which includes information relevant to obtaining authorization for a flight operation. The report generation engine 120 can receive, e.g., from a user request, an identification of an authorization report 122 to generate that is associated with a particular authorizing agency. For instance, the report generation engine 120 can generate an authorization request report 122 with information for an FAA Certificate of Authorization. The report generation engine 122 can obtain information identifying types of information to include in the requested report 122, and generate the report 122 by filling in the respective types of information.

For instance, the report generation engine 120 can receive information identifying a flight operation, e.g., specific UAV, specific operators, specific components, flight path including whether the flight will occur over populated areas, and so on. The report generation engine 120 can then obtain risk assessment information associated with the flight operation, e.g., as described above, and include the risk assessment in the authorization request report 122. For instance, if the authorization request report 122 includes information identifying operators, the report generation engine 120 can include risk assessment information identifying each pilot's license information, number of UAV flights in a particular time period, whether they previously breached flight authorization, their record performing contingency plans, and so on.

Alternatively, or in addition, the report generation engine 120 can receive information identifying a flight operation (e.g., specific UAV, specific operators, specific components, flight path), and obtain performance characteristics associated with the flight operation. In this way, the report generation engine 120 can provide less analysis of the information included in the generated authorization request report. For instance, performance characteristics can identify licenses and/or certificates obtained by an operator, number of flights flown, but not provide risk assessment information including flight errors or failures that can be attributed to the operator.

The generated authorization request report 122 can then be provided to a recipient 140, such as an authorization agency, for approval of the flight operation. Optionally, the report generation engine 120 can access a system controlled by, or in communication with, the recipient 140, and directly provide the authorization request report 122 to the recipient 140 (e.g., over a network to the recipient system).

The UAV processing system 100 optionally includes a permission control engine 130, which can receive an authorization for a flight operation granted by an authorization agency, and generate flight constraint information 132 based off the granted authorization, to be provided to a UAV 134 associated with the flight operation. The permission control engine 130 can receive information identifying the flight operation, and generate constraints associated with the flight operation. For instance, the flight operation can identify that the UAV is to be limited to a particular two-dimension or three-dimensional geofence envelope, e.g., a virtual perimeter for a real world geographic area. The permission control engine 130 can generate instructions to be provided to the UAV 134, e.g., to the UAV autopilot, identifying the geofence envelope. Providing a geofence envelope to a UAV 134, is described below, with reference to FIG. 6. Additional constraints can include airspeed limits, altitude limits, weather limits, time of day limits, number of operator hour limits, and other general configuration constraints of the UAV 134, e.g., specific payload modules can be only be activated at particular times or in particular areas.

Figure 3:
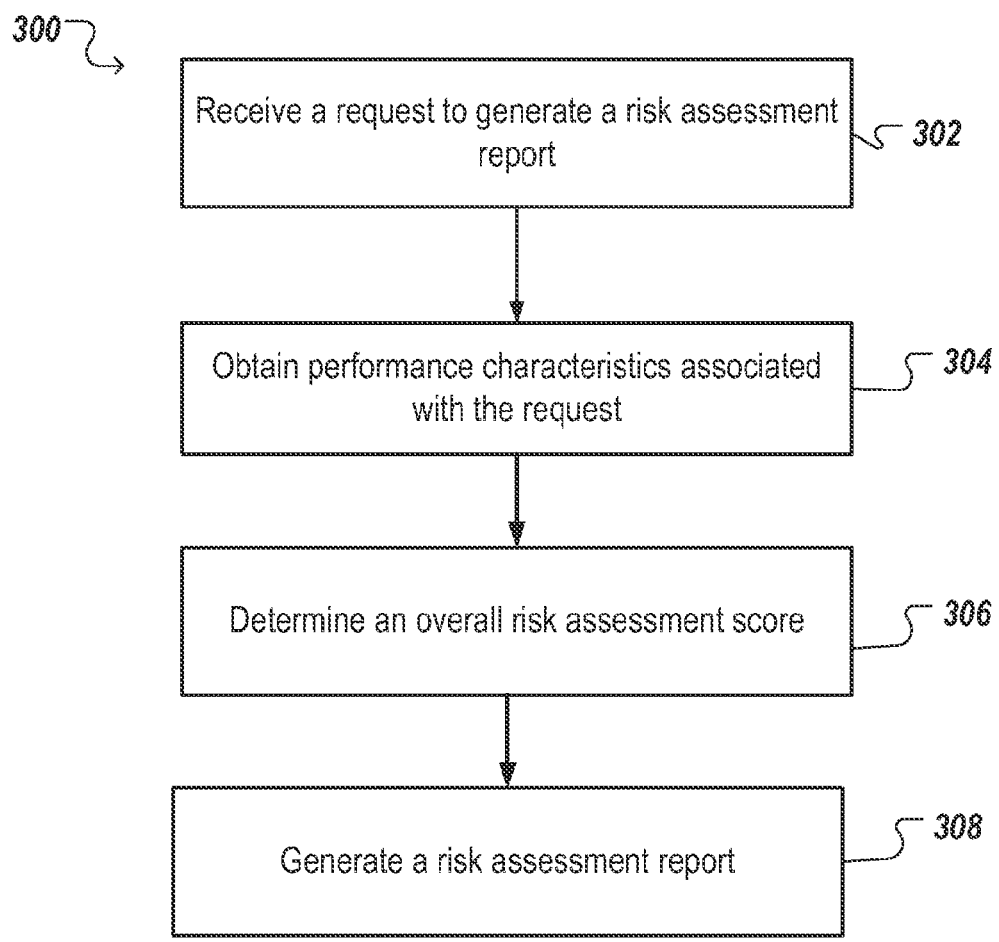
FIG. 3 illustrates a flowchart of an example process for generating a risk assessment report.

FIG. 3 illustrates a flowchart of an example process 300 for generating a risk assessment report. For convenience, the process 300 will be described as being performed by a system of one or more computers, e.g., the UAV processing system 100.

The system receives a request to generate a risk assessment report (block 302). The request can be received from a user device, and identify particular aspects of a flight operation (such as one or more flight operation aspects discussed herein) that the user desires to obtain risk valuations about. For instance, the user can identify that he/she wishes to obtain risk assessment information regarding a particular operator, e.g., pilot.

The system obtains performance characteristics associated with the request (block 304). As described above, with reference to FIG. 1, the example system can determine performance characteristics associated with some or all aspects of a flight operation, including operators, components included in a UAV, a particular UAV or type of UAV, and so on.

The system obtains performance characteristics that are associated with the aspects identified in the received request. For example, the request can identify a particular model of a payload module, e.g., a particular model of an infra-red camera. The system can obtain information identifying performance characteristics of the model included across some or all UAV flight operations. In this way, the system can determine whether the infra-red camera is prone to particular errors or failures, e.g., communication failures, failures with regards to weather patterns, and so on. Optionally, the request and/or obtained information can be limited to a particular version of a model and/or to a specific time period (e.g., information obtained from flights which occurred in the last 3 years or other time period or time range).

In another example, the request can identify a particular type of UAV airframe, and payload modules to be included in the UAV. The system can obtain performance characteristics of the particular type of UAV airframe (e.g., vibration analyses of the airframe in all flight operations), and performance characteristics of the payload modules.

After obtaining performance characteristics associated with the request, the system determines an overall risk assessment score (block 306). The system determines an overall risk assessment score from the risk of each obtained performance characteristic associated with the request.

The system, optionally, can determine a risk assessment score for each aspect identified in the request, and then determine an overall risk assessment score based on the individual risk assessment scores. For example, if the request identifies a particular operator, the system can determine a flight operation failure rate, e.g., a percentage of total UAV flights that resulted in failure that can be attributed to the operator. The flight operation failure rate can be determined by obtaining information identifying a total number of UAV flight operations that resulted in failure when the operator was flying the UAV, and modifying the total number to remove flight operation failures attributed to UAV component failures (e.g., flight critical module failures), weather information (e.g., heavy rains, lightning strikes), and so on. The system can then obtain information identifying an average flight operation failure rate, and compare the operator's failure rate against the average to determine a risk assessment score. The failures may optionally be categorized by the system as mission failures or as safety related failures.

In another example, if the request identified a particular UAV, the system can obtain information describing the UAV (e.g., components included in the UAV, airframe type). The system can then obtain flight operation failures that included the particular UAV, along with risk information associated with the UAV, e.g., vibration analysis, battery health, risk assessments of components, and so on. The system can then determine a risk assessment score based on the obtained information. For instance, the system can determine whether the UAV had contingency plans associated with the flight operation failures, e.g., whether the autopilot controlling the UAV could have avoided failure if it had a contingency plan. If the UAV did not have contingency plans associated with the flight operation failure, the system can assign a higher risk assessment score, since the UAV could have avoided failure upon a software update, e.g., to its autopilot. Similarly, the system can assign a high risk assessment score if the battery health is nearing end of life, and/or if the vibration analysis of the UAV indicates there are structural problems, and/or if the UAV is associated with flight operation failures. In some implementations, the system can modify the flight operation failure information by determining whether the flight operation failures were attributed to operator error, e.g., due to breach of flight authorization by the operator, and so on. If the system determines that the failures can be attributed to operator error, the system can ignore the failures for the purposes of determining a risk assessment score. The system can also determine whether the operator associated with the operator error has a low risk assessment score, e.g., whether the operator is generally a safe pilot. Upon a positive determination, the system can rate the UAV risk assessment score higher by assuming that the UAV is difficult to control, or is associated with other errors not easily captured, e.g., in error logs, flight logs, and so on.

Thus, the system can determine a risk assessment score for each aspect identified in the request using information even tangentially related to the particular aspect. In this way, the system can determine a reliable risk assessment of each aspect.

The system then combines the risk assessment scores to determine a total risk assessment score. As described above, with reference to FIG. 1, the system can obtain weights associated with each aspect, and combine the weighted aspects. For instance, the system can obtain information identifying that a payload module is associated with a low weight, since the payload module will likely not affect flight critical systems. Similarly, the system can obtain information identifying that an operator is associated with a higher weight, since an operator controls the UAV and components in the UAV. The system can then combine the weighted risk assessment scores to arrive at an overall risk assessment score.

Optionally, the system can receive a flight authorization level from the user identifying a relative difficulty, or relative riskiness, of a flight operation. For instance, the user can identify that the UAV will be operating over populated areas. The system can determine that operating over populated areas or with a population density above a specified threshold is associated with a high risk.

The system can modify the risk assessment score depending on the optionally received flight authorization level. For instance, if a flight operation is associated with a low risk, the system can increase the decrease the overall risk assessment score (where the higher the risk the higher the risk assessment score). However, if a flight operation is associated with a high risk, e.g., operation over populated areas, the system can increase the overall risk assessment score. The system can increase the risk assessment score by increasing weights associated with flight failures that result in a UAV landing unintentionally in the populated areas. For instance, if the system determines that a UAV includes a particular component, e.g., a motor, that is known to fail in 1% of flight operations, the system can increase the weight associated with the motor risk assessment score.

The system generates a risk assessment report to provide to the user (block 308). The system generates a document, e.g., a web page, file, or text document, that includes the determined overall risk assessment score. The report can include risk assessment scores of each aspect identified in the request, and specific information relevant to the report.

For instance, if the system determines that a particular UAV was involved in a higher than average percentage of flight operations that resulted in an operational error, the system can identify the specific percentage. The system can also identify whether the operational error resulted from operator error, from a particular component malfunctioning, and so on.

The risk assessment score can be received by an insurance company, and used to insure a particular UAV, particular operator, or entire flight operation.

Figure 4:
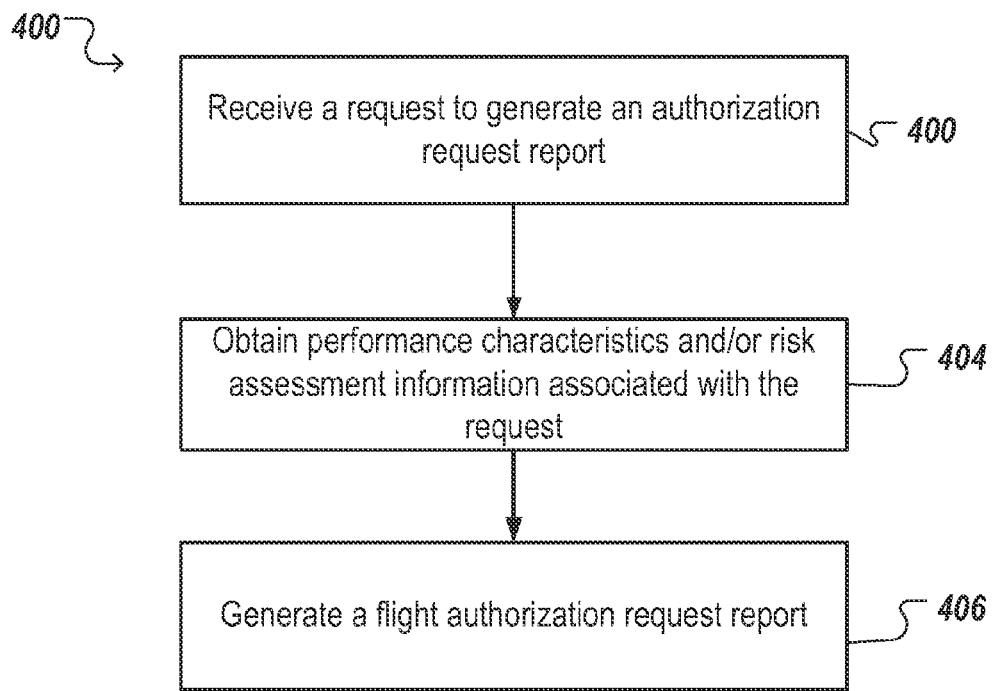
FIG. 4 illustrates an example process for generating an authorization request report.

FIG. 4 illustrates an example process 400 for generating an authorization request report. The example process 400 will be described as being performed by a system of one or more computers, e.g., the UAV processing system 100.

The system receives a request to generate an authorization request report (block 402). A user can provide a request identifying a flight operation, e.g., a particular UAV including configuration information of components in the particular UAV, particular operators, contingency behaviors, a particular flight path such as over-flight areas, and so on. Additionally, the request can include an identification of the particular authorization request type the user wants to generate. For example, the user can indicate that he/she wishes to generate a Certificate of Authorization from the FAA.

The system obtains performance characteristics and/or risk assessment information associated with the request (block 404).

The system can obtain performance characteristics (e.g., one or more of the performance characteristics described herein), or more complicated risk assessment information, to include in the authorization request report. That is, the system can optionally include more fundamental information on, for example, an operator (e.g., instrument rating obtained by the operator, number of flights flown, certificates obtained, etc.), or determine more complicated information to include, e.g., number of flight operations that resulted in an error or failure which can be attributed to the operator. The user can select whether he/she wants the authorization request report to include the performance characteristics, or a more detailed risk assessment report. For example, to obtain an authorization request report for a flight operation over private unpopulated land, the user might select only performance characteristics to preserve the privacy of the operator. However, for flight operations over populated areas, the user can include risk assessment information.

The system generates a flight authorization request report (block 406). The system generates a report, e.g., a document that includes types of information associated with a type of authorization request identified in the request. The system provides performance characteristics and/or risk assessment information associated a given type of information in the report, optionally in easy to understand human readable formats. For example, the authorization request report can include the following types of requested information, UAV flight performance, e.g., over a period of time, UAV flight heritage, contingency behaviors, UAV flight termination systems, and UAV airspace deconfliction abilities, types of components to be used in the flight operation, and so on.

The system can store information identifying text or phrases to utilize when generating the flight authorization request report. For instance, the system can obtain information identifying that for an operator, the system is to include risk assessment information in a particular text, e.g., "The operator has obtained the following licenses:". The system can then include the performance characteristics and/or risk assessment information in the text.

The system can optionally include an overall risk assessment score for the flight operation, and risk assessment scores for each aspect of the flight operation.

Cloud System

During flight operations of several UAVs, risks associated with UAVs entering the same airspace can be encountered absent a system that can coordinate and have knowledge of each UAV's flight operation or present location. A cloud system, e.g., a system of one or more computers, in communication with multiple UAVs over a wireless channel and/or with associated ground stations, can receive requests, from UAVs (and/or associated ground stations) for specific geofences, e.g., two-dimensional or three-dimensional geofences, and approve or deny the requests based on previously allocated geofences. As described above, a geofence envelope is a virtual perimeter for a real-world geographic area. After the cloud system provides approval for a specific geofence envelope, the cloud system can allocate the geofence envelope to the UAV. The UAV can then receive information identifying the approval, and limit its location movements to the specifically approved geofence envelope. In some implementations, if a UAV operator moves the UAV outside of the geofence envelope, the UAV can override control and automatically move the UAV back into compliance. Furthermore, optionally the cloud system can receive a flight path associated with a UAV, and upon determining that the flight path would violate previously allocated geofences, determine an updated recommended flight path that would not violate allocated geofences. The updated recommended flight path can include the same waypoints identified in the original flight path, or one or more of the waypoints.

As an example, a UAV can request an updated geofence envelope as the result of a flight operational contingency due to one or more flight operation errors or failures.

Figure 5:
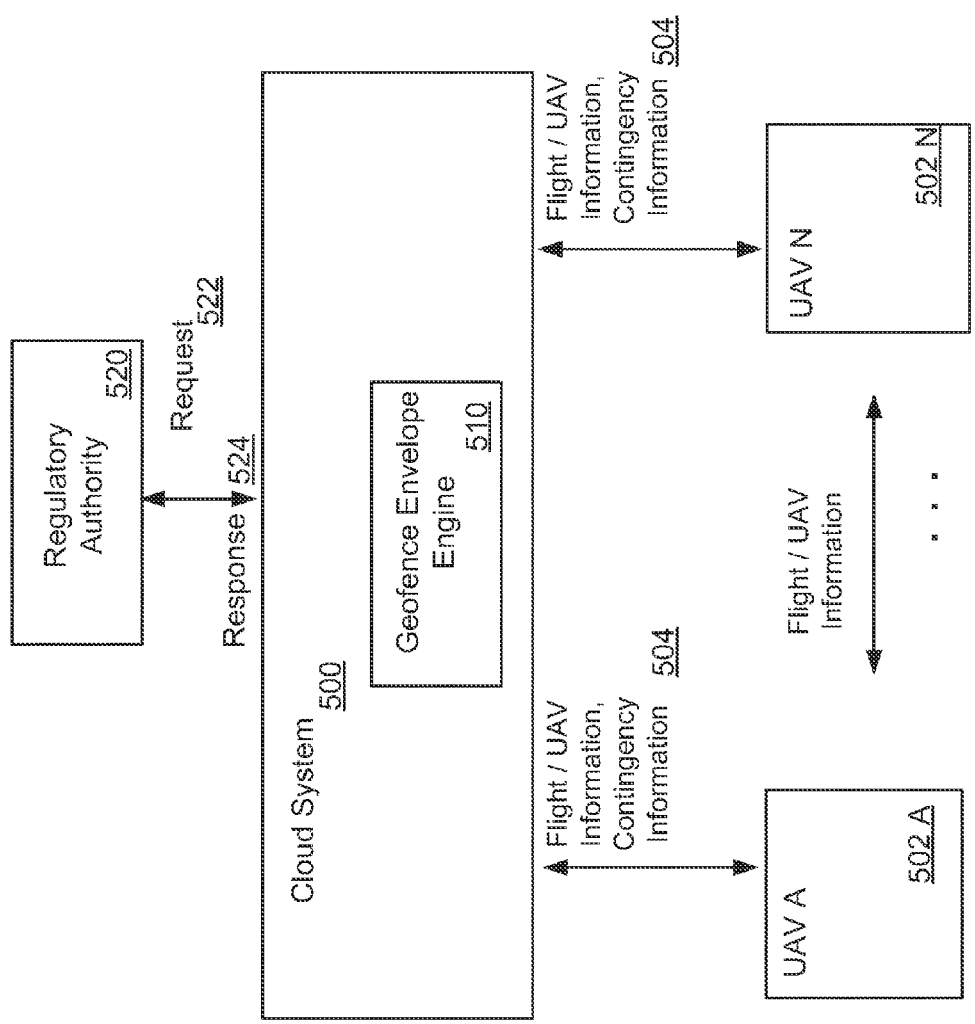
FIG. 5 illustrates a block diagram of an example cloud system.

FIG. 5 illustrates a block diagram of an example cloud system 500. The cloud system 500 is in communication with UAVs, e.g., UAV A-N 502A-502N, and one or more regulatory authorities 520, e.g., the Federal Aviation Administration. Optionally, the cloud system 500 is in communication with one or more ground stations associated with one or more of the UAVs and can receive instructions or information and provide instructions and information from such ground stations. The ground stations may include operator (e.g., pilot) terminals via which the operator and cloud system may interact. For example, the operator terminals may present on terminal displays user interfaces configured to provide information and instructions to the operator and/or to receive information and instructions from the operator.

The cloud system 500 stores, and maintains, flight operation information associated with the UAVs 502A-N. Flight operation information includes configuration information of each UAV, flight mission and planned flight path, operator information (e.g., obtained licenses), it's precise three-dimensional location in space, velocity information, UAV status (e.g., health of components included in the UAV), contingency plans, and so on.

Prior to a particular UAV flying, the cloud system 500 can obtain information identifying the particular UAV's flight operation, including an intended geofence envelope. A geofence envelope engine 510, included in the cloud system 500, can approve or deny the intended geofence envelope, based on prior allocated geofence envelopes that will be used by UAVs during a flight time of the particular UAV.

Furthermore, the geofence envelope engine 510 can rapidly approve a new geofence envelope for a UAV already in flight, and provide approval upon determining that the new geofence envelope has not been allocated. A UAV can request a new geofence envelope upon determining that one or more contingency situations have occurred. For instance, the UAV can determine that another UAV is violating its airspace or geofence envelope. In another example, the UAV can determine that it lacks sufficient fuel to complete its mission, and needs to immediately take a different path to return to base, e.g., a location configured to accept a landing UAV, such as the UAV's point of takeoff. Examples of predicting a contingency are described below, with reference to FIG. 7.

A particular UAV 502A can attempt to provide a request to the cloud system 500, but be unable to communicate with the cloud system 500, e.g., due to interference, failure of a particular datalink, and so on. The particular UAV 502A, can optionally communicate with another UAV 502N that can relay the request to the cloud system 500.

Optionally, the cloud system 500 can provide requests 522 identifying geofence envelopes, determined by the geofence envelope engine 510, for approval by a regulatory authority 520, and obtain a response 524. The request 522 can further identify contingencies experienced by a UAV, and potential risks associated with a flight operation failure, e.g., described above with reference to FIGS. 1 and 3.

Figure 6:
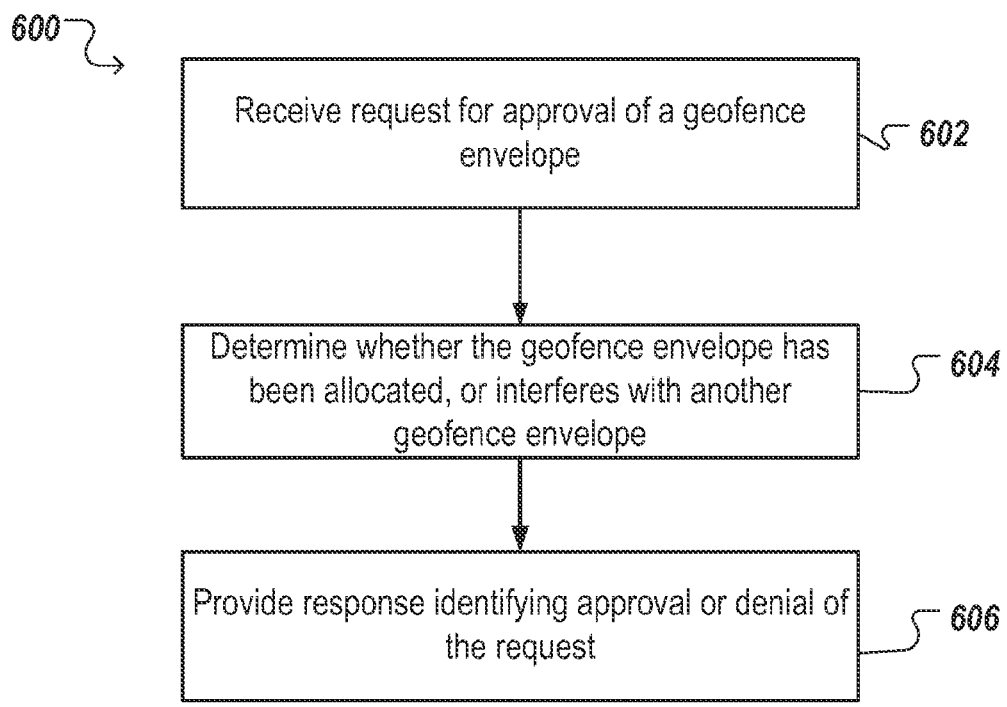
FIG. 6 is a flowchart of an example process for managing geofence envelopes allocated to UAVs.

FIG. 6 is a flowchart of an example process 600 for managing geofence envelopes allocated to UAVs. For convenience, the process 600 will be described as being performed by a system of one or more computers, e.g., the cloud system 500.

The system receives a request for approval of a geofence envelope from a UAV (block 602) or associated ground station. A UAV, e.g., a presently flying UAV, or a UAV not yet in flight, can request approval of its flight path by identifying a specific geofence envelope that comports with the flight path. The UAV (or associated ground station) can identify that it includes hardware, or software, to enforce an approved geofence envelope, e.g., through use of an autopilot. The request can further identify one or more waypoints, e.g., locations in space, that the UAV wishes to pass through.

As will be described below, with reference to FIG. 7, a UAV in flight (or associated ground station) can determine that it has to execute a contingency plan, e.g., due to an error with the UAV. The UAV (or associated ground station) can then provide a request to the system identifying an updated geofence envelope, and optionally information identifying the particular cause of the contingency plan.

The system determines whether the geofence envelope has been allocated, or interferes with another geofence envelope (block 604). As described above, with reference to FIG. 5, the system stores information describing UAVs in flight, including geofence envelopes that have been previously approved and allocated by the system, or an outside system in communication with the system.

The system determines whether the requested geofence envelope interferes with any previously allocated geofence envelope. The system can effect this determination by comparing the space identified by the allocated geofence envelopes to the space identified by the requested geofence envelope. Upon a positive determination that the requested geofence envelope interferes with an allocated geofence envelope, the system can deny the request. Upon a negative determination, the system can approve the request, or optionally provide the request for approval by a regulatory authority, e.g., the Federal Aviation Administration.

The system provides a response identifying approval or denial of the request (block 606). As described above, the system can determine whether to approve or deny allocation of the requested geofence envelope. If the system denies the requested geofence envelope, the system can optionally determine and provide an updated geofence envelope that includes zero or more of the waypoints the requesting UAV wishes to pass through.

If the system provides approval of the request to the requesting UAV (or associated ground station), the requesting UAV can ensure that the UAV stays within the approved envelope. For instance, the UAV can restrict the allowable flight maneuvers, and can lock out control of the UAV, e.g., by an operator, and return the UAV to within the geofence envelope, if the UAV violates the geofence envelope.

Figure 7:
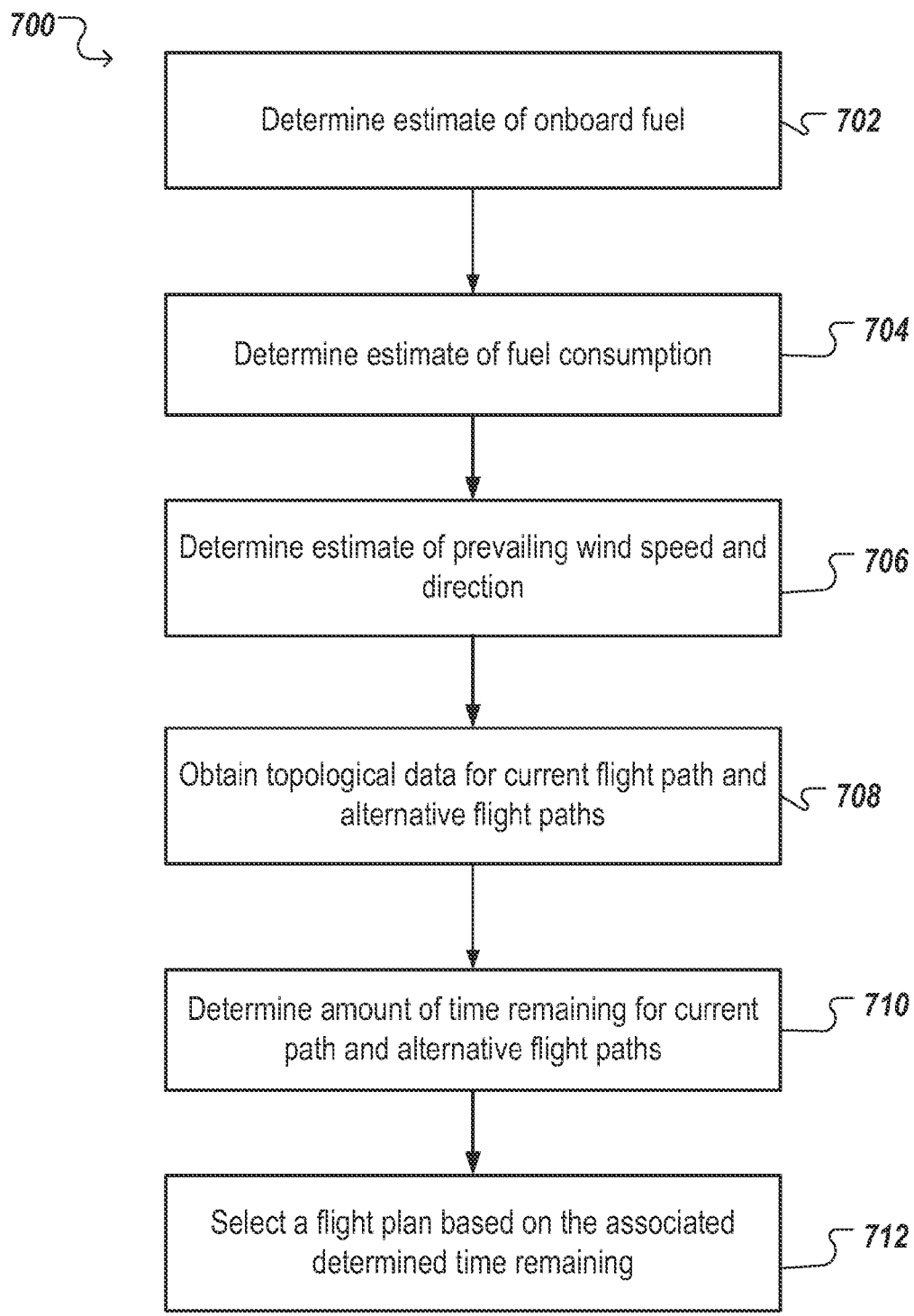
FIG. 7 illustrates an example process for contingency prediction by a UAV.

FIG. 7 illustrates an example process 700 for contingency prediction by a UAV. For convenience, the process 700 will be described as being performed by a UAV that includes one or more processors.

The UAV determines an estimate of onboard fuel (block 702). The UAV can determine an estimate at particular predetermined or dynamically determined sampling rates, e.g., every 10 minutes, every 15 minutes, or upon an occurrence of a particular event or combination of events, e.g., after operating for a particular period of time, detecting a strong headwind, any updates to the UAV's flight path, and so on.

If the UAV uses batteries for power, the UAV can perform methods including coulomb-counting, and estimating remaining charge from a currently measured battery cell voltage.

If the UAV uses fuel for power, the UAV can perform methods including measuring the mass or volume of fuel liquid remaining, e.g., through use of a sensor in a container that holds the fuel.

The UAV determines an estimate of fuel consumption (block 704). The UAV determines an estimate of fuel consumption, e.g., during a nominal cruising speed and UAV climb rate. To determine the estimate, the UAV can perform an online machine-learning algorithm that learns the rate of fuel consumption as the UAV is flying.

Example online machine-learning algorithms can create a functional mapping from the cruise flight state, e.g., cruising flight speed and climb rate, of the UAV, to the rate of fuel consumed, e.g., current draw at a particular voltage, or flow rate of liquid fuel to the UAV's engine. Examples can include, least squares, neural networks, and so on. Additionally, the rate of fuel consumption can be estimated prior to flight of the UAV, e.g., from simulations or through fuel rate consumption of similar aircrafts.

The UAV determines an estimate of prevailing wind speed and direction (block 706). The UAV can determine estimates of wind speed and direction through use of an online estimator.

An example online estimator obtains measurements of the freestream speed and direction vector using, for example, a pitot-static airspeed probe. The online estimator further obtains the ground track speed and direction vector using location and navigation systems, e.g., global position system (GPS), and so on.

The example online estimator computes a difference between the two obtained vectors, and obtains the prevailing wind speed and direction as the difference.

Optionally, the UAV can communicate with an outside system, e.g., a ground or satellite datalink, or a weather center, and obtains information identifying real-time wind conditions.

The UAV obtains topological terrain data for the current flight path, and also for alternative flight paths (block 708). Terrain data can include elevation data, and can be stored by the UAV prior to takeoff, or received in response to the UAV providing a request to an outside system, e.g., a ground datalink. Alternative flight paths can include, for instance, a flight path to return to a point of takeoff, a flight path that excludes one or more waypoints, and so on. Optionally, The UAV can determine to exclude one or more waypoints based on prevailing wind speed and direction. For instance, if one or more waypoints are in a direction against the prevailing wind, the UAV can determine to exclude those waypoints, and determine flight paths to waypoints that are parallel, or in the direction of, the wind direction.

The UAV determines a minimum safe flight altitude for the current flight path. The UAV can effect this determination by computing a sum of the elevation data with a particular constant identifying a safe distance above the elevation data. The constant can optionally vary according to elevation data. For instance, a higher elevation, e.g., a mountain, can include particular weather affects associated with the mountain. The UAV can therefore determine that the minimum safe flight altitude is greater at the higher elevation.

Similarly, the UAV determines a minimum safe flight altitude for the alternative flight paths.

The UAV determines an amount of flight time remaining for the current path, and for each alternative flight path (block 710). The UAV determines the amount of flight time using the prevailing wind speed and direction, along with the topological terrain data to determine an amount of time remaining for each of the flight paths. Since the UAV can compute a total estimated distance the UAV has to travel for each flight path, e.g., a total two-dimensional distance and a total ascent/descent for each flight path, the UAV can estimate a time remaining given a particular airspeed of the UAV, e.g., a nominal airspeed.

The UAV selects a flight path based on the determined time remaining for each flight path (block 712).

The UAV computes a multiplication of the time remaining for each flight path with the estimated rate of fuel consumption, e.g., described in step 704, to obtain an estimated amount of fuel required to complete each flight path. The UAV then subtracts the resulting computation from the estimated fuel remaining in the UAV, e.g., described in step 702, to obtain an estimated amount of fuel remaining after the flight path.

If the UAV determines that the estimated amount of fuel remaining after the flight path is below a threshold, e.g., below zero, or below a safe threshold amount of fuel, the UAV can determine whether an alternative flight path would be greater than the threshold.

The UAV can select an alternative flight path by determining all of the alternative flight paths that would allow the UAV to complete the flight path with fuel greater than the threshold. The UAV can then select the alternative plan that includes most of the waypoints. Optionally, the UAV can select the alternative plan that includes the most important waypoints, e.g., from information identifying a hierarchy of waypoints.

If the UAV determines that the estimated amount of fuel remaining after each alternative flight path is below the threshold, the UAV can determine an updated landing location. For instance, the UAV can obtain information identifying safe landing locations, e.g., from stored information, from a cloud system, e.g., cloud system 500, or from a regulatory authority, e.g., the Federal Aviation Administration.

The UAV can provide a request to the cloud system identifying an updated flight path (e.g., selected from an alternative flight path, or a flight path to a safe landing location), along with an updated geofence envelope for the updated flight path, and upon approval of the flight path, travel to the landing location within the bounds of the updated geofence envelope. The UAV can also receive a recommended flight path from the cloud system, e.g., as described above with reference to FIG. 6.

The UAV can optionally provide information to an operator via an operator terminal, e.g., to a pilot, identifying the determined contingency prediction and the updated flight path. The operator can then implement the updated flight path, or the UAV can enforce the updated flight path, e.g., updated geofence envelope.

Figure 8:
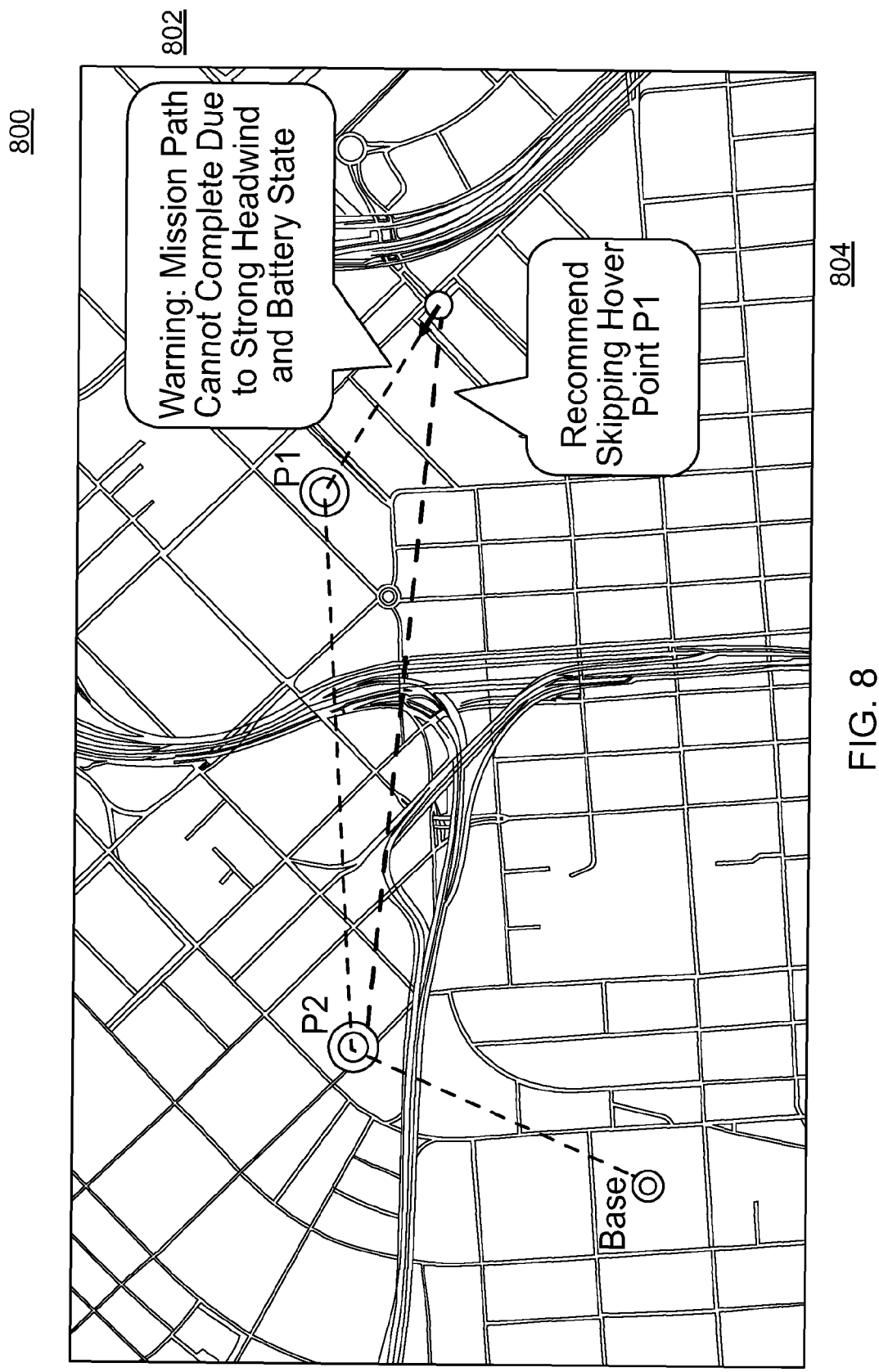
FIG. 8 is an illustration of a user interface identifying a determined contingency prediction and an updated flight path.

FIG. 8 is an illustration of a user interface 800 identifying a determined contingency prediction and an updated flight path. In the illustration, a UAV has determined that it is unable to complete the flight path 802, e.g., original flight path, and identifies information associated with the determination, e.g., headwind too strong for battery state. The UAV provides information to an operator via an operator terminal identifying an alternative flight path 804, e.g., "Recommend skipping hover point P1." As described above, with reference to FIG. 7, the UAV can also enforce the alternative flight path, e.g., after receiving approval from a cloud system 500.

While, for illustrative purposes, the foregoing description and figures may refer to a UAV, techniques, systems, and processes disclosed herein may be applied to other vehicles, including other aerial vehicles and to manned or unmanned land or sea vehicles. While certain computing and communication functions may be described as being performed by a UAV, such computing and communication functions may be performed by other systems (e.g., a ground station or another aerial platform in communication with the UAV).

For more details, see U.S. patent application Ser. No. 14/709,263, entitled "DISTRIBUTED UNMANNED AERIAL VEHICLE ARCHITECTURE," filed on May 11, 2015, U.S. patent application Ser. No. 14/709,287, entitled "DISTRIBUTED UNMANNED AERIAL VEHICLE ARCHITECTURE," filed on May 11, 2015, U.S. patent application Ser. No. 14/709,360, entitled "UNMANNED AERIAL VEHICLE AUTHORIZATION AND GEOFENCE ENVELOPE DETERMINATION," filed on May 11, 2015, U.S. patent application Ser. No. 14/709,364, entitled "UNMANNED AERIAL VEHICLE AUTHORIZATION AND GEOFENCE ENVELOPE DETERMINATION," filed on May 11, 2015, each of which is incorporated by reference herein in its entirety.

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the risk assessment system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. An Unmanned Aerial Vehicle (UAV) system, comprising:
one or more sensor interfaces; and
a computing system comprising one or more computing devices, said computing system programmed to implement:
an estimator engine, the estimator engine configured to:
determine an estimated fuel remaining in the UAV;
determine an estimated fuel consumption of the UAV;
determine, using information obtained via the one or more sensor interfaces from sensors included in the UAV, estimated information associated with wind affecting the UAV that indicates a direction of the wind;
determine estimated flight times remaining for a current flight path that includes a plurality of waypoints, and one or more alternative flight paths that each include one or more of the plurality of waypoints, wherein determining an estimated flight time, for each of the current and alternative flight paths, uses:
the determined estimated fuel remaining,
the determined estimated fuel consumption,
the information associated with wind, and information describing the current and alternative flight paths; and
in response to determining that the estimated fuel remaining, after completion of the current flight path, would be below a threshold, select an alternative flight path that excludes one or more of the plurality of waypoints in a direction of travel substantially against the direction of the wind based on:
a hierarchy of the waypoints included in the current flight path,
the determined estimated fuel remaining, the determined estimated fuel consumption, and
the information associated with wind.

2. The system of claim 1, wherein the system is further configured to:
obtaining information identifying one or more waypoints included in the current flight path but excluded in the selected alternative flight path; and
providing, to a remote system associated with an operator and for presentation by the remote system, information identifying the excluded waypoints.

3. The system of claim 1, wherein the system is further configured to:
transmit, over the air the selected alternative flight path to a cloud system for approval, wherein the cloud system maintains flight path information associated with a plurality of UAVs.

4. The system of claim 3, wherein the system is further configured to:
receive approval from the cloud system identifying a geofence envelope associated with the selected alternative flight path.

5. The system of claim 1, wherein the system is further configured to:
determine the one or more alternative flight paths to each include at least one of the waypoints in the current flight path that corresponds to a return landing location of the UAV in the current flight path.

6. The system of claim 1, wherein information describing a particular flight path in the current and alternative flight paths includes respective associated topological information.

7. A method implemented by an Unmanned Aerial Vehicle (UAV) in flight, the UAV comprising an electronic system comprising hardware, the method comprising:
determining, by the UAV electronic system, an estimated fuel remaining in the UAV;
determining, by the UAV electronic system, an estimated fuel consumption of the UAV;
determining by the UAV electronic system, using information obtained from sensors included in the UAV, estimated information associated with wind affecting the UAV that indicates a direction of the wind;
determine estimated flight times remaining for a current flight path that includes a plurality of waypoints, and one or more alternative flight paths that each include one or more of the plurality of waypoints, wherein determining an estimated flight time, for each of the current and alternative flight paths, uses:
the determined estimated fuel remaining,
the determined estimated fuel consumption,
the information associated with wind, and
information describing the current and alternative flight paths; and
in response to determining that the estimated fuel remaining, after completion of the current flight path, would be below a first threshold, selecting an alternative flight path that excludes one or more of the plurality of waypoints in a direction of travel substantially against the direction of the wind based on:
a hierarchy of the waypoints included in the current flight path,
the determined estimated fuel remaining, the determined estimated fuel consumption, and
the information associated with wind.

8. The method of claim 7, further comprising:
transmitting, by the UAV to a remote system associated with an operator, information identifying the selected alternative flight path.

9. The method of claim 8, further comprising:
obtaining information identifying one or more waypoints included in the current flight path but excluded in the selected alternative flight path; and
providing, to the remote system associated with the operator and for presentation by the remote system, information identifying the excluded waypoints.

10. The method of claim 7, further comprising:
providing information regarding the selected alternative flight path to a remote cloud system for approval, wherein the cloud system maintains flight path information associated with a plurality of UAVs.

11. The method of claim 10, further comprising:
receiving approval of the selected alternative flight path from the cloud system; and
providing information to an autopilot included in the UAV to enforce the selected alternative flight path.

12. The method of claim 10, wherein receiving approval comprises:
receiving information identifying a geofence envelope associated with the selected alternative flight path.

13. The method of claim 10, further comprising:
providing the selected alternative flight path to a remote cloud system for approval, wherein the cloud system maintains flight path information associated with a plurality of UAVs.

14. The method of claim 10, wherein the cloud system is associated with a regulatory authority.

15. The method of claim 7, further comprising:
determining the one or more alternative flight paths, wherein at least one alternative flight path includes at least one of the waypoints in the current flight path that corresponds to a return landing location of the UAV in the current flight path.

16. The method of claim 7, wherein information describing a particular flight path in the current and alternative flight paths includes respective associated topological information.

17. A computer program product, encoded on one or more non-transitory computer storage media, comprising instructions that when executed by one or more processors included in an Unmanned Aerial Vehicle (UAV) cause the one or more processors to perform operations comprising:
determining an estimated fuel remaining in the UAV;
determining an estimated fuel consumption of the UAV;
determining, using information obtained from sensors included in the UAV, estimated information associated with wind affecting the UAV that indicates a direction of the wind;
determine estimated flight times remaining for a current flight path that includes a plurality of waypoints, and one or more alternative flight paths that each include one or more of the plurality of waypoints, wherein determining an estimated flight time, for each of the current and alternative flight paths, uses:
the determined estimated fuel remaining,
the determined estimated fuel consumption,
the information associated with wind, and
information describing the current and alternative flight paths; and
in response to determining that the estimated fuel remaining, after completion of the current flight path, would be below a first threshold, selecting an alternative flight path that excludes one or more of the plurality of waypoints in a direction of travel substantially against the direction of the wind based on:
a hierarchy of the waypoints included in the current flight path,
the determined estimated fuel remaining, the determined estimated fuel consumption, and
the information associated with wind.

18. The computer program product of claim 17, wherein the operations further comprise:
providing, to a system associated with an operator, information identifying the selected alternative flight path.

19. The computer program product of claim 18, wherein the operations further comprise:
providing, to the system associated with the operator and for presentation by the remote system, information identifying the excluded waypoints.

20. The computer program product of claim 17, wherein the operations further comprise:
providing the selected alternative flight path to a cloud system for approval, wherein the cloud system maintains flight path information associated with a plurality of UAVs.

21. The computer program product of claim 20, wherein the cloud system is associated with a regulatory authority.

22. The computer program product of claim 20, wherein the operations further comprise:
receiving approval of the selected alternative flight path from the cloud system; and providing information to an autopilot included in the UAV to enforce the selected alternative flight path.

23. The computer program product of claim 22, receiving approval comprises:
receiving information identifying a geofence envelope associated with the selected alternative flight path.

24. The computer program product of claim 17, wherein the operations further comprise:
determining the one or more alternative flight paths, wherein at least one alternative flight path includes a waypoint corresponding to a return landing location of the UAV in the current flight path.

* * * * *